(12) United States Patent
Pappas et al.

(10) Patent No.: US 9,301,087 B1
(45) Date of Patent: Mar. 29, 2016

(54) METHOD AND APPARATUS FOR CONNECTING A BLUETOOTH DEVICE

(71) Applicant: MOTOROLA SOLUTIONS, INC, Schaumburg, IL (US)

(72) Inventors: Scott J Pappas, Lake Zurich, IL (US); Hope E Braun, Chicago, IL (US); James M Nowakowski, Buffalo Grove, IL (US); Thomas J Senese, Schaumburg, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 0 days.

(21) Appl. No.: 14/617,121

(22) Filed: Feb. 9, 2015

(51) Int. Cl.
*H04B 7/00* (2006.01)
*H04W 4/00* (2009.01)
*H04W 76/02* (2009.01)
*H04W 52/02* (2009.01)

(52) U.S. Cl.
CPC .......... *H04W 4/008* (2013.01); *H04W 52/0212* (2013.01); *H04W 76/023* (2013.01)

(58) Field of Classification Search
CPC ............................ H04M 1/7253; H04W 84/18
See application file for complete search history.

(56) References Cited

U.S. PATENT DOCUMENTS

| | | | | |
|---|---|---|---|---|
| 6,275,500 B1* | 8/2001 | Callaway et al. | ............. | 370/449 |
| 6,327,300 B1* | 12/2001 | Souissi et al. | ................. | 375/219 |
| 9,078,260 B2* | 7/2015 | Habetha et al. | | |
| 2003/0096576 A1* | 5/2003 | Salonidis et al. | ............... | 455/41 |
| 2008/0031184 A1* | 2/2008 | Seo | ............................... | 370/328 |
| 2010/0020729 A1* | 1/2010 | Walley et al. | ................. | 370/277 |
| 2012/0202425 A1* | 8/2012 | Glezerman et al. | .......... | 455/41.2 |

OTHER PUBLICATIONS

Cardo, Scalarider 03/03 Multiset User Guide, Dec. 18, 2014; 16 Pages.

* cited by examiner

*Primary Examiner* — David Bilodeau (57) ABSTRACT

A method and apparatus for connecting a Bluetooth device is provided herein. During operation a priority list is used by a Bluetooth piconet master. The Bluetooth piconet master will receive feedback from all slave devices, and then control connections among devices within the piconet based on the priority list and the feedback. The Bluetooth piconet master controls the piconet such that when a first Bluetooth device is connected to a lower-priority Bluetooth device, connection to a higher-priority Bluetooth device will only take place if the higher-priority Bluetooth device becomes "active" (as determined from the feedback). Therefore, as long as the higher-priority Bluetooth device remains "inactive", the connection to the lower-priority Bluetooth device will remain.

7 Claims, 5 Drawing Sheets

| HEADSET DEVICE PRIORITY |
|---|
| WORK PHONE |
| PERSONAL PHONE |
| CAR |
| ... |

METHOD AND APPARATUS FOR CONNECTING A BLUETOOTH DEVICE

FIELD OF THE INVENTION

The present invention generally relates to connecting Bluetooth devices, and more particularly to a method and apparatus for connecting Bluetooth devices within a collaborative environment.

BACKGROUND OF THE INVENTION

Bluetooth uses a method called bonding for recognizing specific devices and thus enabling control over which devices are allowed to connect to each other. Devices then can establish a connection without user intervention. A bond is created through a process called "pairing". The pairing process is typically triggered by a specific request to create a bond from a user via a user interface.

Pairing typically involves some level of user interaction. This user interaction is the basis for confirming the identity of devices. Once pairing successfully completes, a bond will have been formed between the two devices, enabling those two devices to connect to each other in the future without again requiring the pairing process. When desired, the bonding relationship can later be removed by the user.

Many techniques exist that "choose" what device to connect to. For example, in US Patent Publication No. 2013/0157573 entitled "Mobile Bluetooth Device", it is suggested to determine a spatial relationship between mobile Bluetooth devices to allow for an automatic reconnection of the mobile Bluetooth device to one of the number of Bluetooth terminals (e.g., automatically connect to the closest Bluetooth device). This allows reconnection without manual interaction by the user. Similarly, European Patent Application No. EP 2 672 762, entitled "Connecting the Highest Priority Bluetooth Device to a Device" automatically drops and connects Bluetooth devices based on a priority level.

A problem exists in the above techniques in that those higher priority/closer devices may not be of interest to the user when they are automatically connected. For example, assume a user is listening to music over a Bluetooth headset connected to a low-priority first device and they move near a closer/higher-priority second device. Simply automatically switching the user to the second device may annoyingly cause the music to cease playing. However, if the second device has important content (e.g., a telephone call from your boss), it may be desirable to switch devices. Therefore, a need exists for connecting Bluetooth devices within a collaborative environment that reduces the chances that a Bluetooth device will be needlessly automatically connected.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above, mentioned need, a method and apparatus for connecting a Bluetooth device is provided herein. During operation a priority list is used by a Bluetooth piconet master. The Bluetooth piconet master will receive feedback from all slave devices, and then control connections among devices within the piconet based on the priority list and the feedback. The Bluetooth piconet master controls the piconet such that when a first Bluetooth device is connected to a lower-priority Bluetooth device, connection to a higher-priority Bluetooth device will only take place if the higher-priority Bluetooth device becomes "active" (as determined from the feedback). Therefore, as long as the higher-priority Bluetooth device remains "inactive", the connection to the lower-priority Bluetooth device will remain.

It should be noted that the term "active" and "inactive" are meant to indicate whether or not a device has information to transmit to another device. So for example, a first device is said to become "active" when it has information to transmit to a second device. The second device may currently be connected to a third device. Thus, a device may be "inactive", yet be in a powered-on state, actively communicating with nearby Bluetooth devices via the piconet.

As an example of the above, assume that a user is wearing a Bluetooth headset and carrying both a higher-priority work phone and a lower-priority personal phone. The headset may receive music transmitted from their personal phone via the Bluetooth connection, even though the higher-priority work phone is present. If the work phone becomes "active" (e.g., receives an incoming call), the connection between the headset and the personal phone is terminated and a connection to the higher-priority work phone is made to the headset. If the work phone becomes "inactive", a connection may again be made between the lower-priority personal phone and the headset.

Figure 1:
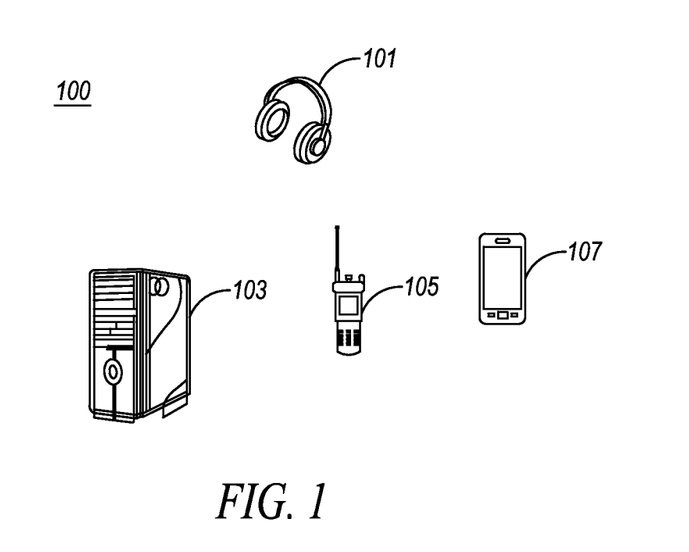
FIG. 1 illustrates an environment where multiple Bluetooth devices exist.

FIG. 1 illustrates an environment where multiple Bluetooth devices exist. As shown, multiple devices 101-107 are within a same environment 100. Environment 100 may comprise, for example, any environment within a transmission range of a Bluetooth device (e.g., any area within, say, 100 feet).

Devices 101-107 are considered Bluetooth devices in that they operate using a Bluetooth, a short range wireless communications technology at the 2.4 GHz band, commercially available from the "Bluetooth special interest group". Devices 101-107 may comprise devices such as a laptop computer, a personal computer, a public-safety radio, a smart phone, a headset, a pedometer, or any device capable of using Bluetooth communications.

Devices 101-107 are connected via Bluetooth technology in an ad hoc fashion forming a piconet. In a piconet, there is one master device and one or more slave devices. The number of slave devices is limited by the capability of the master device. All communication within a piconet is between the master and slave devices. There is no direct communication between the slave devices over a piconet, although these devices may have separate Bluetooth connections between then not using the piconet.

After a piconet is established, the slave devices are synchronized to the timing and frequencies specified by the master device. Note that in a piconet, each slave device uses a different physical channel. Thus, a piconet starts with two connected devices, and may grow to any number of connected devices (although in some systems eight is the maximum number of devices within a Bluetooth piconet). Bluetooth communication always designates one of the Bluetooth devices as a main controlling unit or master unit. Other devices that follow the master unit are slave units. This allows the Bluetooth system to be non-contention based (no collisions). This means that after a Bluetooth device has been added to the piconet, each device is assigned a specific time period to transmit and they do not collide or overlap with other units operating within the same piconet.

In the present invention, the master Bluetooth device contains a "priority" list of potential connections for at least one device 101-107. For example, headset 101 may have public-safety radio 105 as a highest priority device, personal phone 107 as a lesser-priority device, and computer 103 as a lowest-priority device.

Figure 2:
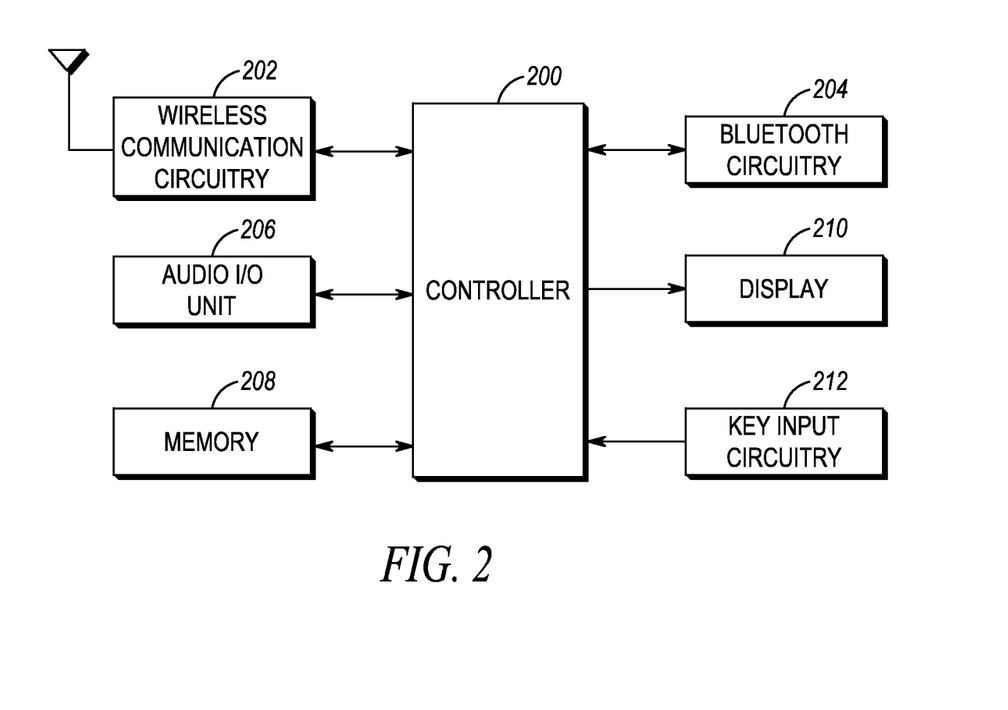
FIG. 2 is a block diagram of a Bluetooth device.

FIG. 2 is a block diagram of a Bluetooth device, for example, device 101-107, for establishing a Bluetooth connection. Devices 101-107 include a controller 200, wireless communication circuitry 202, Bluetooth circuitry 204, audio input/output (I/O) circuitry 206, memory 208, display 210, and key input circuitry 212.

Controller 200 comprises a microprocessor, a programmable logic device, or application specific integrated circuit (ASIC) and is utilized to access and control components of device 101-107. Particularly, controller 200 controls the overall operation of device 101-107, and may control the operation of a particular device to function as a master or slave device.

Wireless communication circuitry 202 transmits and receives wireless signals for mobile communication of device 101-107 under control of the controller 200. Communication circuitry 202 is preferably a well known long-range transceiver that utilizes any one of a number of communication system protocols, such as cellular communication system protocols, or the Apco 25 (Project 25) communication system protocol, IEEE 802.11 communication system protocol, HyperLAN protocols, or any other communication system protocol.

Bluetooth circuitry 204 performs Bluetooth communication with Bluetooth devices in the vicinity of device 101-107 under control of the controller 200. Thus, circuitry 204 comprises a standard Bluetooth transceiver used to receive and transmit between devices using the Bluetooth communication system protocol. Circuitry 204 is also used for communication over the piconet.

Audio I/O circuitry 206 inputs and outputs various sounds, such as voice or audio from audio files, associated with operations of device 101-107 and/or the controller 200.

Display 210 displays images generated by operations of the controller 200, while key input circuitry 212 provides various key inputs needed for operations of the device 101-107, input from the user, to controller 200.

Key input circuitry 212 may include a touch screen panel mounted on or included in display 210, and may include numeric/character keys for inputting numeric/character information, and function keys for setting various functions. In one embodiment of the present invention, key input circuitry 212 serves to receive information on priority levels for each device in a similar manner as described in European Patent Application No. EP 2 672 762, entitled "Connecting the Highest Priority Bluetooth Device to a Device" automatically drops and connects Bluetooth devices based on a priority level.

Memory 208 comprises standard random access memory and stores programs for operations of the controller 200 and stores various data generated during execution of operations of devices 101-107 and/or the controller 200. Memory 208 also stores priority lists. Such a list is illustrated in FIG. 3.

Figure 3:
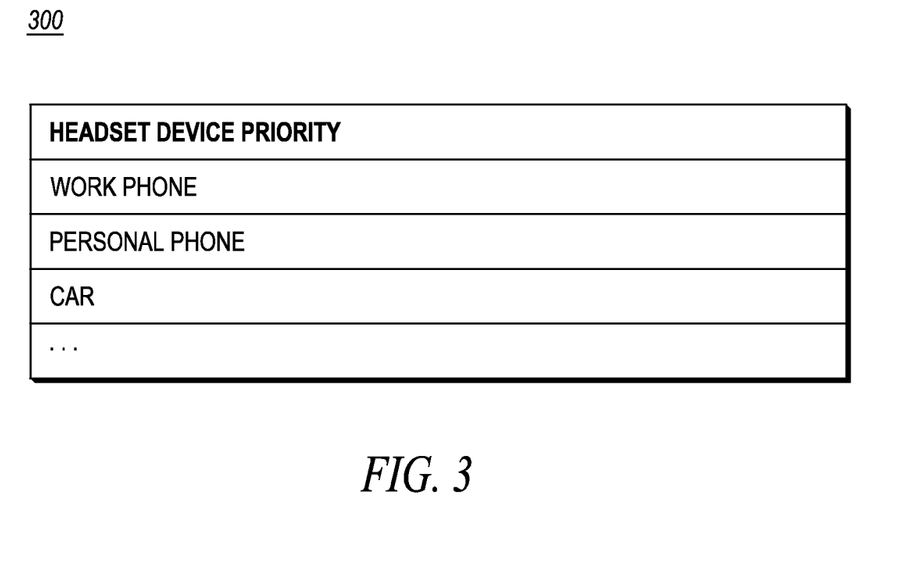
FIG. 3 illustrates a device priority list.

As shown in FIG. 3, and described above, memory 208 comprises a table having device priority. The priority list preferably comprises a list of devices whose priorities are registered by a user, and is stored in the memory 208 by the controller 200. During operation of the piconet, the piconet will attempt to a connect highest-priority active Bluetooth devices. So, for example, assume list 300 defines a device priority for a Bluetooth headset. Based on list 300, the piconet will attempt to connect to an active personal phone before attempting to connect to an active car, simply because the personal phone is of higher priority than the car.

Operation as discussed above helps alleviate the situation of automatically connecting high-priority devices in that those higher priority/closer devices that are not of interest to the user. As is evident, the present invention address this issue by allowing lower-priority devices to make connections when they become active, and any higher-priority device is inactive. In accomplishing this, all devices 101-107 will establish a collaborative connection by forming a Bluetooth piconet (as known in the art). A priority list 300 for a particular piconet device will exist within the master device's memory 208. The master device will monitor active and inactive connections among the various devices and instruct devices to make the appropriate active connection based on the priority list. This is illustrated in FIG. 4 and FIG. 5.

Figure 4:
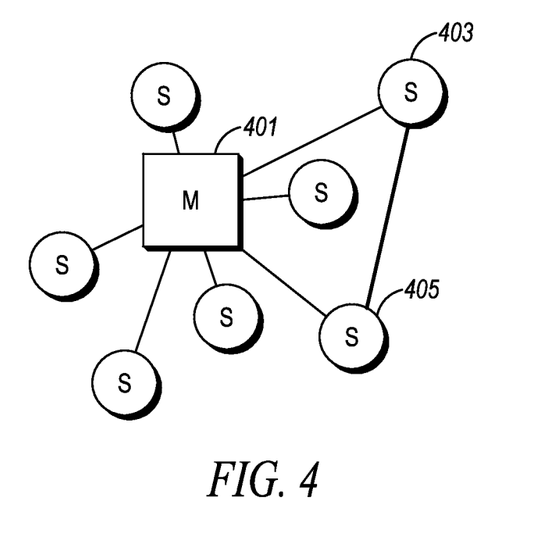
FIG. 4 illustrates a collaborative operational environment among Bluetooth devices.

FIG. 4 illustrates a Bluetooth piconet. Bluetooth networks (commonly referred to as piconets) use a master/slave model to control when and where devices can send data to each other via an active connection (outside the piconet), and to the master via the piconet. In FIG. 4, master 401 is in communication with slave device 403 and slave device 405. Additionally, slave devices 403 and 405 form an active peer-to-peer communication link between the two for data transmission outside the piconet. In this model, master device 401 can be connected to up to seven different slave devices. Any slave device in the piconet can only be connected to a single master 401. Master 401 coordinates communication throughout the piconet. Master 401 can send data to any of its slaves and request data from them as well. Thus, master and slaves can form a piconet to communicate as well as form a peer-to-peer connection with each other outside the piconet (i.e., not using the piconet). In the preferred embodiment of the present invention, the piconet comprises a Bluetooth piconet and the peer-to-peer connections among devices comprise standard Bluetooth connections, however in alternate embodiments of the present invention, any piconet (e.g., 802.11) or peer-to-peer communication system protocol may be used to form these connections.

Figure 5:
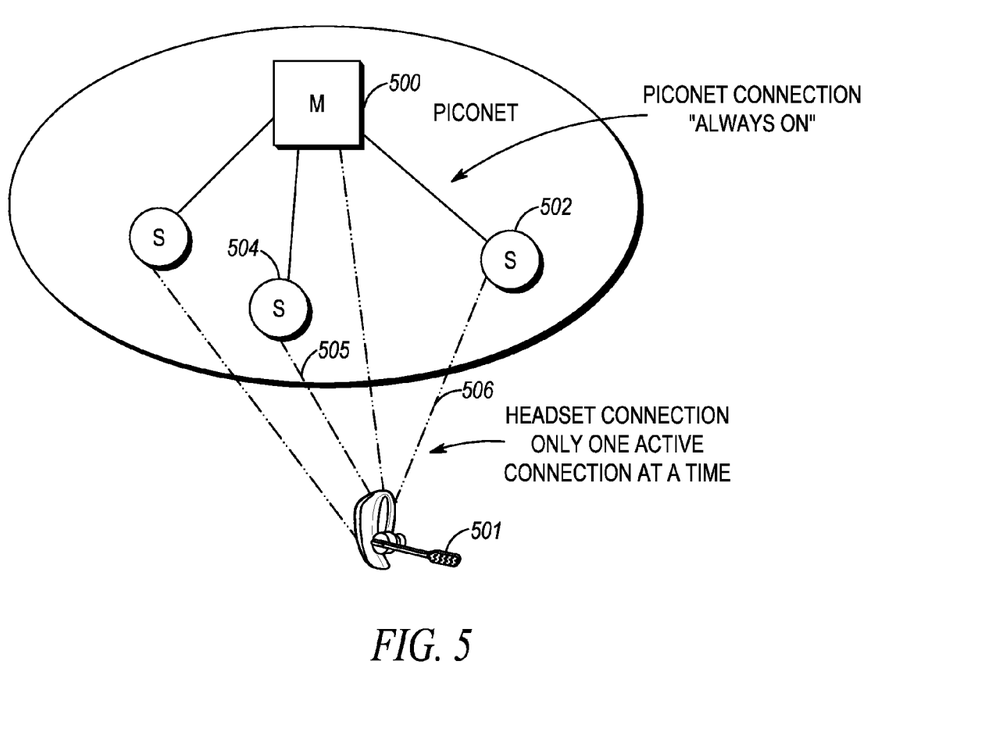
FIG. 5 illustrates a collaborative operational environment among Bluetooth devices.

FIG. 5 illustrates that a peer-to-peer headset connection can be formed to each of the devices in a piconet. It is important to observe that only one headset connection is active at a given time. This is in contrast to the piconet connections. The solid piconet connections shown in FIG. 5 are referred to as "collaborative connections".

Expanding on the above, FIG. 5 illustrates a collaborative operational environment among various Bluetooth devices. As shown, a piconet is formed with a master and slave devices. In this particular example, wireless Bluetooth headset 501 is provided that may, or may not be part of the piconet. Master device 500 contains a priority list for Bluetooth headset 501. Bluetooth headset 501 is capable of forming an active peer-to-peer connection with any piconet device (only one at a time).

Assume that slave device 502 comprises a police radio and slave device 504 comprises a smart phone 504. Also assume that for Bluetooth headset 501, smart phone 504 has lesser priority that police radio 502. During operation, a user may be listening to music using headset 501, connected to lesser-priority smart phone 504 using connection 505 (as discussed, connection 505 is peer-to-peer and is not part of the piconet). When higher-priority police radio 502 becomes active, connection 505 will drop, and headset 501 will form a connection 506 to police radio 502. If police radio 502 becomes inactive, connection 505 may again be formed.

In order to add and drop connections as described above, master device 500 will have the device priority list. Master device 500 will also be notified (via the Bluetooth piconet) when slave devices are active or inactive. Thus, when a slave device becomes active, and all higher priority devices are inactive, the master will instruct any higher-priority connection (i.e., any connection to higher-priority devices) to drop (via for example only, an SCO Link Release message), and also instruct a connection to the lower priority active device (via, for example an SCO Link Establishment message). All instructions to add/drop connections take place using the piconet.

Summarizing the above, assume that a user is listening to music over their smart phone 504 via headset 501. Master 500 recognizes that police radio 502 has priority to use the headset connection (when police radio 502 becomes active). Thus, when police radio 502 becomes active, police radio 502 notifies master 500 of this fact using the piconet connection. The master notifies police radio 502 that it should form an active Bluetooth communication link (link 506) to headset 501. Master 500 will instruct smart phone 504 to deactivate its Bluetooth connection with headset 501.

Figure 6:
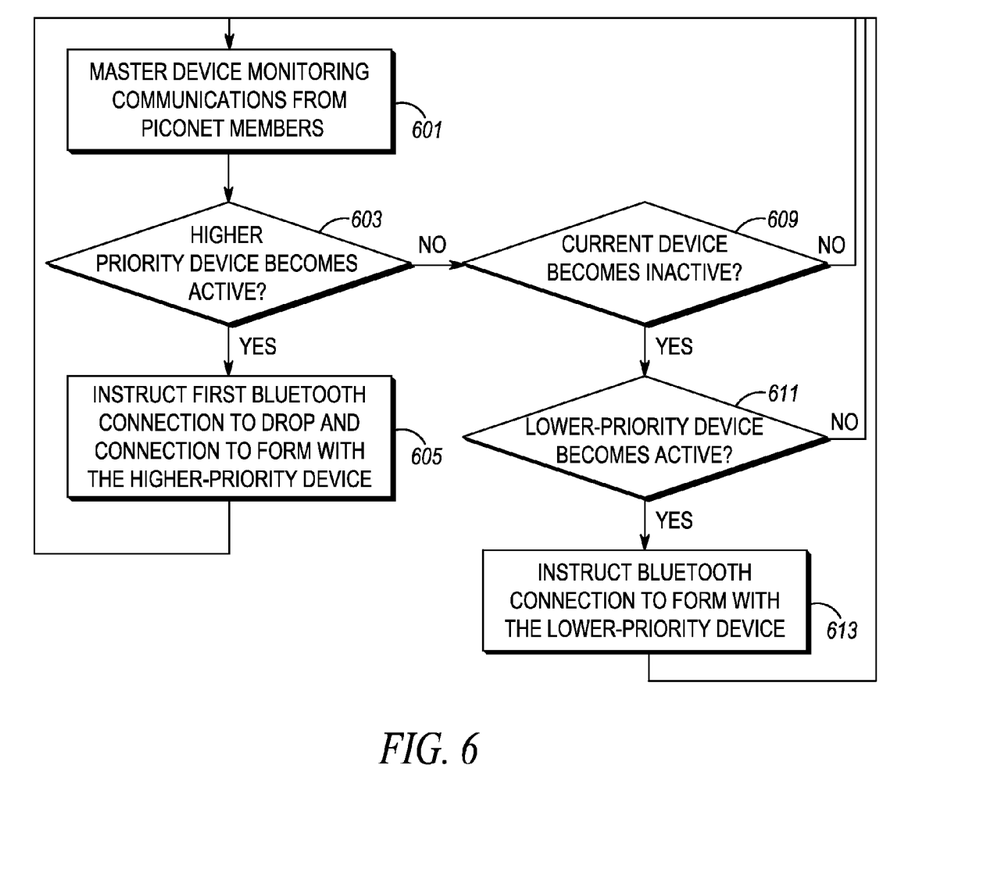
FIG. 6 is a flow chart showing operation of a Bluetooth master device.

FIG. 6 is a flow chart showing operation of a master piconet device. The logic flow of FIG. 6 assumes a Bluetooth piconet has been formed and that a first device has formed peer-to-peer a Bluetooth connection with a second device that does not use the piconet for data communications. The logic flow begins at step 601 where controller 200 uses Bluetooth circuitry 204 to actively monitor communications from the piconet. At step 603 controller 200 uses a priority list stored in memory 208 to determine if a higher priority device has become active for the first device. If so, the logic flow continues to step 605 where controller uses Bluetooth circuitry 204 to instruct the first Bluetooth device (via the piconet) to drop its current connection to the second Bluetooth device, and to establish another connection with the higher priority Bluetooth device.

Returning to step 603, if controller determines that no higher-priority device has become active, the logic flow continues to step 609 where it is determined if the Bluetooth connection between the first device and the second device has become inactive. As discussed above, this is accomplished via receiving this information over the Bluetooth piconet. For example, if the first device determines that no data has been received from the second device for a predetermined period of time (e.g., 1 minute), then this fact may be reported to the piconet master. If, at step 609 it has been determined that the connection between the first and the second device has become inactive, the logic flow continues to step 611 where controller determines if any lower-priority device has become active. If so, the logic flow continues to step 613 where controller 200 instructs the first device to drop the current connection and form a connection to the lower-priority Bluetooth device.

It should be noted that controller 200 instructs connections to form and drop by sending instructions to particular devices using the piconet. However, an active connection that is formed or dropped does not use the piconet, instead, the active connection comprises a simple peer-to-peer Bluetooth connection.

The above procedure results in the monitoring of communications from a first slave device over the piconet, the first slave device connected to a second device via a communication link that does not use the piconet. A message is received over the piconet that a third device has become active, and a priority of the third device is determined. Finally, instructions are set to the first slave device to drop its peer-to-peer connection to the second device and instructing the third device to add a peer-to-peer connection to the second device based on the priority and an active status of the third device.

As discussed above, the piconet may comprise a Bluetooth piconet and the peer-to-peer connection may comprise a Bluetooth peer-to-peer connection.

Figure 7:
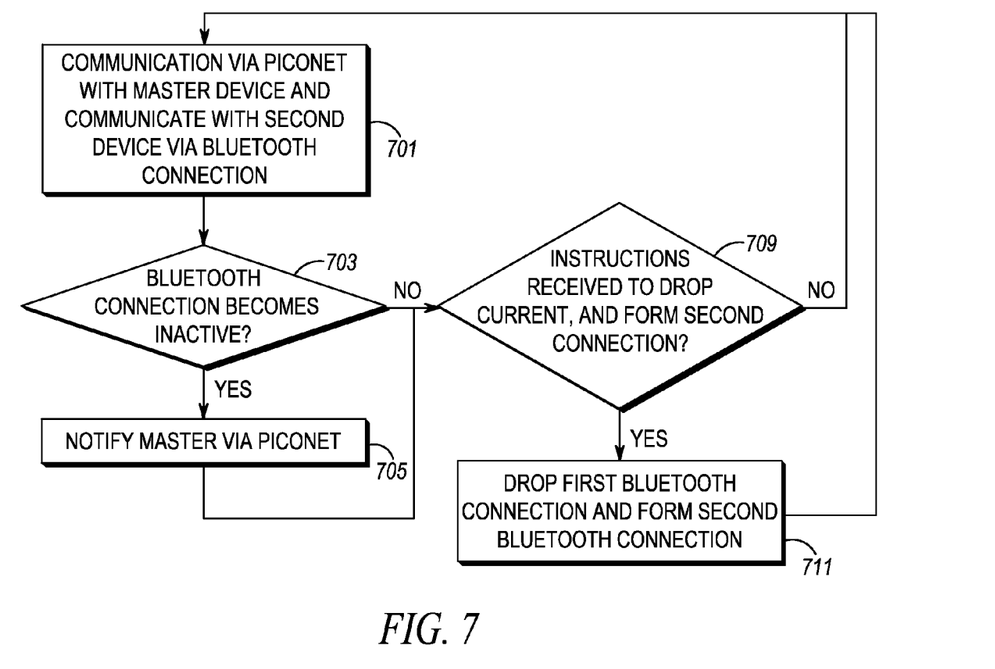
FIG. 7 is a flow chart showing operation of a Bluetooth slave device.

FIG. 7 is a flow chart showing operation of a slave Bluetooth device of FIG. 2. The logic flow begins at step 701 where communication via a piconet takes place with a master device, while communications outside the piconet takes place with a second device via an active peer-to-peer connection. At step 703 controller 200 determines if the Bluetooth connection has become inactive, and if so, the logic flow continues to step 705 where circuitry 204 is used to notify the piconet master of this fact. The logic flow continues to step 709 where controller 200 determines if instructions were received from the master that instruct the device to drop the current peer-to-peer connection and form a second peer-to-peer connection. If so, the logic flow continues to step 711 where the first peer-to-peer connection is dropped and the second peer-to-peer connection is formed.

Figure 8:
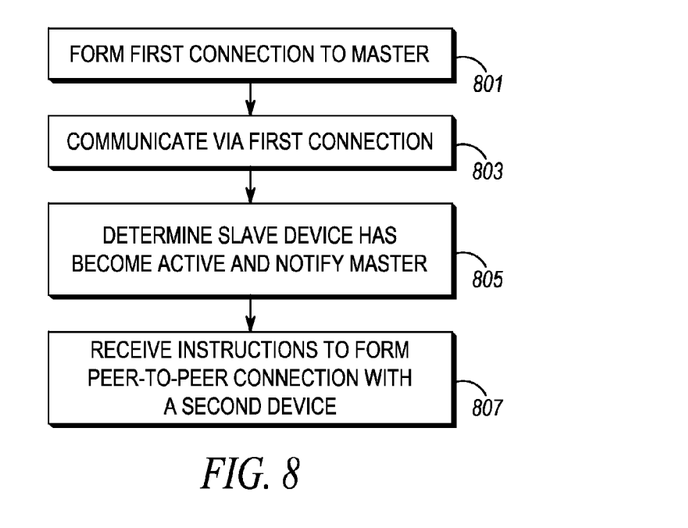
FIG. 8 is a flow chart showing operation of the Bluetooth slave device.

FIG. 8 is a flow chart showing operation of a slave device in accordance with another embodiment of the present invention. The logic flow begins at step 801 where a first connection to a piconet master device is formed by circuitry 204 as part of a piconet. At step 803 communications takes place via the first connection to a piconet master. Controller 200 then determines that the slave device has become active (e.g., placing or receiving a phone call via the monitoring of circuitry 202) and then notifies the piconet master device that the piconet slave device has become active (step 805). Finally, at step 807 instructions are received in response to the notification, from the piconet master, to form a peer-to-peer connection to a second device.

As discussed above, the step of forming the first connection to the piconet master device as part of the piconet comprises the step of the step of forming the first connection to the piconet master device as part of a Bluetooth piconet. Additionally, the step of receiving, in response to the notification, instructions from the piconet master to form the peer-to-peer connection to the second device comprises the step of receiving, in response to the notification, instructions from the piconet master to form a Bluetooth peer-to-peer connection to the second device.

In the foregoing specification, specific embodiments have been described. However, one of ordinary skill in the art appreciates that various modifications and changes can be made without departing from the scope of the invention as set forth in the claims below. For example, as described above, all devices do not need to be part of the same Bluetooth piconet in order to practice the present invention. Similarly, while the invention was described using a Bluetooth piconet, one of ordinary skill in the art will recognize that a piconet using any standard (e.g., Zigbee) may be used instead. Finally, although devices were connected outside of the piconet using a standard Bluetooth connection, in alternate embodiments of the present invention other connection types may be made (e.g., 802.11). Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of operating a master device within a piconet, the method comprising the steps of:
   monitoring communication from a first slave device over the piconet, the first slave device connected to a second device via a communication link that does not use the piconet;
   receiving a message over the piconet that a third device has become active;
   determining a priority of the third device; and instructing the first slave device to drop its connection to the second device and instructing the third device to add a connection to the second device based on the priority and an active status of the third device.

2. The method of claim 1 wherein the step of monitoring communication from the first slave device over the piconet comprises the step of monitoring the communication over a Bluetooth piconet.

3. The method of claim 1 wherein the step of monitoring communication from the first slave device over the piconet, the first slave device connected to the second device via the communication link that does not use the piconet comprises the step of monitoring communication from the first slave device over a Bluetooth piconet, the first slave device connected to the second device via a Bluetooth communication link that does not use the piconet.

4. An apparatus comprising:

a controller monitoring communication from a first slave device over a piconet, the first slave device connected to a second device via a communication link that does not use the piconet;

circuitry receiving a message over the piconet that a third device has become active;

the controller determining a priority of the third device and using the Bluetooth circuitry to instruct the first slave device to drop its connection to the second device and instructing the third device to add a connection to the second device based on the priority and an active status of the third device.

5. The apparatus of claim 4 wherein the piconet comprises a Bluetooth piconet.

6. The apparatus of claim 5 wherein the communication link comprises a peer-to-peer communication link.

7. The apparatus of claim 6 wherein the peer-to-peer communication link comprises a peer-to-peer Bluetooth communication link.

* * * * *